United States Patent
Tanaka

(10) Patent No.: US 9,461,747 B2
(45) Date of Patent: Oct. 4, 2016

(54) OPTICAL TRANSCEIVER INCLUDING SEPARATE SIGNAL LINES IN ADDITION TO AN SPI BUS BETWEEN A PROCESSOR DEVICE AND A LOGIC DEVICE

(71) Applicant: SUMITOMO ELECTRIC INDUSTRIES, LTD., Osaka-shi, Osaka (JP)

(72) Inventor: Yasuhiro Tanaka, Yokohama (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 126 days.

(21) Appl. No.: 14/444,538

(22) Filed: Jul. 28, 2014

(65) Prior Publication Data

US 2015/0030336 A1     Jan. 29, 2015

(30) Foreign Application Priority Data

Jul. 29, 2013  (JP) ................. P2013-157008

(51) Int. Cl.
*G06F 13/12* (2006.01)
*H04B 10/40* (2013.01)
*G02B 6/42* (2006.01)

(52) U.S. Cl.
CPC ............ *H04B 10/40* (2013.01); *G02B 6/4292* (2013.01)

(58) Field of Classification Search
CPC .............................. H04B 10/40; G02B 6/4292
USPC ....................................................... 710/315
See application file for complete search history.

(56) References Cited

U.S. PATENT DOCUMENTS

| | | | | |
|---|---|---|---|---|
| 6,826,658 B1* | 11/2004 | Gaither | ................. | H04B 10/40 711/150 |
| 7,580,637 B2* | 8/2009 | El-Ahmadi | ........... | H04L 1/0057 398/135 |
| 2004/0180628 A1* | 9/2004 | Moriwaki | ............. | H04L 7/0008 455/73 |
| 2006/0069822 A1* | 3/2006 | Moriwaki | ............. | G06F 13/385 710/71 |
| 2011/0135312 A1* | 6/2011 | El-Ahmadi | ........... | H04L 1/0057 398/135 |

FOREIGN PATENT DOCUMENTS

| | | |
|---|---|---|
| JP | 2012-049812 | 9/2012 |
| JP | 2012-169745 | 9/2012 |

* cited by examiner

*Primary Examiner* — Titus Wong
(74) *Attorney, Agent, or Firm* — Smith, Gambrell & Russell, LLP.

(57) ABSTRACT

A compact optical transceiver is provided by using a serial communication bus as a communication bus connecting a logic device and a microcomputer. This optical transceiver is connected through an MDIO bus to an external upper layer and is provided with a microcomputer, a logic device, the MDIO bus, a serial communication bus, and a first dedicated signal line. The microcomputer has an MDIO register. The logic device receives a command code, address information, and a single data block from the upper layer through the MDIO bus, transmits the address information and the single data block to the microcomputer through the serial communication bus, and transmits the OP code to the microcomputer through the first dedicated signal line.

4 Claims, 8 Drawing Sheets

OPTICAL TRANSCEIVER INCLUDING SEPARATE SIGNAL LINES IN ADDITION TO AN SPI BUS BETWEEN A PROCESSOR DEVICE AND A LOGIC DEVICE

BACKGROUND OF THE INVENTION

1. Field of the Invention

The present invention relates to an optical transceiver having an MDIO interface.

2. Related Background Art

Patent Literature 1 describes an optical transceiver with an MDIO Management Data Input/Output) interface. The optical transceiver described in Patent Literature 1 is connected to an external upper layer (host device). The optical transceiver has a microcomputer and a logic device. The logic device is connected through an MDIO bus to the upper layer and connected through a parallel communication bus to the microcomputer. The microcomputer monitors an internal state of the optical transceiver. The microcomputer has an MDIO register set for storing a plurality of single data blocks indicative of the internal state of the optical transceiver and the prescribed information necessary for monitoring and controlling by the external upper layer. The logic device acquires through the parallel communication bus a single data block stored in the MDIO register set. A position (address) of each single data block stored among a plurality of registers in the MDIO register set is preliminarily determined depending upon a content of the single data blocks. The address of the MDIO register is specified by address information transmitted through the MDIO bus from the upper layer. The upper layer performs reading/writing of a single data block from or into the MDIO register specified by the address information, through the logic device.

Patent Literature 2 describes a communication device with a plurality of devices and a control device. The control device receives MDIO communication data from an external device. The control device refers to "ADDRESS" indicative of a destination of the communication data. When "ADDRESS" indicates a device conforming with the MDIO communication protocol, the control device transmits the MDIO communication data to the target device by use of the MDIO communication protocol. When "ADDRESS" indicates a device conforming with the SPI communication protocol, the control device transmits the SPI communication data to the target device by use of the SPI communication protocol.

Patent Literature 1: Japanese Patent Application Laid-Open Publication No. 2012-169745

Patent Literature 2: Japanese Patent Application Laid-Open Publication No. 2012-49812

SUMMARY OF THE INVENTION

Recently, there have been demands for increase of transmission speed and capacity in communication networks. The optical transceivers have been expected to be more downsized, for realizing higher-density aggregation in a transmission system. For realizing downsizing of the optical transceivers, the number of signal lines between the logic device and the microcomputer is desirably as small as possible. Decrease in the number of signal lines enables the size of the logic device and the size of the microcomputer to be made smaller and also enables the wiring area of the signal lines on a substrate to be reduced.

In Patent Literature 1, the communication bus connecting the logic device and the microcomputer is the parallel communication bus. The parallel communication bus has, for example, twenty signal lines. For example, if the parallel communication bus were changed to a serial communication bus (SPI bus), the number of signal lines would be reduced to four. As a result, the change would allow the size of the logic device and the size of the microcomputer to be made smaller and also allow the wiring area on the substrate to be reduced.

The MDIO interface, including the bus and the protocol, is compliant with the MSA (Multi-Source Agreement) Specification. The MDIO bus consists of two signal lines, clock signal MDC and data signal MDIO. Communication through the MDIO bus is performed in units of 64-bit length data called "MDIO frame" and there are four types of MDIO frames, "address setting," "write," and "read" (two types), depending upon purposes. The type of each frame is designated by an OP code (command code) of 2-bit length contained in the frame. The communication through the MDIO bus is carried out, for example, at a maximum frequency of 4 MHz (minimum period of 0.25 µs).

For example, in the communication device described in Patent Literature 2, where hardware of the device for communicating through the SPI communication protocol has high-speed performance enough to operate at the required maximum frequency, the communication can be successfully performed as long as the device operates as designed. However, in the optical transceiver described in Patent Literature 1, the microcomputer executes software (firmware) to perform a response process. For this reason, if the microcomputer adopted were one of a relatively small scale suitable for downsizing, there would occur a delay of the response process by the software due to deficiency of processing capability, which could make the communication difficult through the serial communication bus.

Particularly, when the upper layer performs "readout," a time available for the logic device from reception of the command code to a start of transmission of a single data block read out from the microcomputer to the upper layer (which will be referred to hereinafter as "readout start time") is only 12 bits (e.g., 3 µs as a minimum time) in comparison with the length of the MDIO frame of 64 bits. However, the readout process takes the time of several µs, as a result of totaling a time for the logic device to transmit the command code to the microcomputer through the serial communication bus, an overhead time of an external interrupt process for a slave selector signal (/SS) by the software of the microcomputer, a time of transmission of the single data block from the MDIO register to a transmission register of the serial communication bus, and so on. Therefore, if the logic device and the microcomputer should be connected through the serial communication bus, there might be a risk of failure in normal communication through the MDIO bus.

Therefore, it is one of objects of the present invention, for example, to use the serial communication bus for the communication between the logic device and the microcomputer and adopt a compact microcomputer, thereby achieving downsizing of the optical transceiver.

An optical transceiver according to one aspect of the present invention is an optical transceiver able to communicate with an external upper layer through an MDIO bus, the optical transceiver comprising: a microcomputer configured to monitor and control an internal state of the optical transceiver; and a logic device configured to receive a command code, address information, and a single data block from the external upper layer through the MDIO bus, transmit the address information and the single data block to the microcomputer through a serial communication bus, and transmit information of the command code to the microcomputer through a first dedicated signal line independent of the serial communication bus.

In the optical transceiver according to the foregoing one aspect of the present invention, the logic device transmits the address information and the single data block through the serial communication bus and transmits the command code through the dedicated signal line independent of the serial communication bus. For this reason, it becomes feasible to keep the time taken by the logic device from the reception of the command code from the upper layer to the start of transmission of the data read out from the microcomputer to the upper layer, within a predetermined time. Therefore, this configuration allows the serial communication bus to be used as the communication bus connecting the logic device and the microcomputer and thus allows a compact microcomputer to be adopted, thereby achieving downsizing of the optical transceiver.

In the optical transceiver according to one aspect of the present invention, the microcomputer comprises: an address register configured to store the address information; an MDIO register configured to store the single data block; and a transmission register configured to store the single data block and convert the stored single data block into serial data and output the serial data onto the serial communication bus, and the microcomputer writes the single data block stored in the MDIO register specified by the address information stored in the address register into the transmission register when the microcomputer receives the address information or the single data block from the logic device. In this manner, the data transfer from the MDIO register to the transmission register is carried out prior to reception of the next command code by the microcomputer. This operation reduces a time necessary for the upper layer to read the single data block stored in the MDIO register. Therefore, the serial communication bus can be adopted as the communication bus connecting the logic device and the microcomputer.

In the optical transceiver according to one aspect of the present invention, the first dedicated signal line consists of two digital signal lines to transmit 2-bit binary data in parallel.

In the optical transceiver according to one aspect of the present invention, the optical transceiver comprises a second dedicated signal line consisting of one digital signal line, instead of the first dedicated signal line.

In the optical transceiver according to one aspect of the present invention, the logic device transmits either one of information about whether the command code is a readout command and information about whether the command code is a writing command through a second dedicated signal line to the microcomputer. The information on whether the command code is readout has a bit count smaller than that of the command code itself. For this reason, if only the information on whether the command code is readout is useful to reduction of the readout start time, the number of signal lines can be reduced. Therefore, it becomes feasible to further downsize the optical transceiver. In addition, the same effect can be obtained when the information on whether the command code is writing is used, instead of the information on whether the command code is readout.

According to one aspect of the present invention, it is at least feasible, for example, to use the serial communication bus as the communication bus connecting the logic device and the microcomputer and adopt a compact microcomputer, thereby achieving downsizing of the optical transceiver.

DETAILED DESCRIPTION OF THE PREFERRED EMBODIMENTS

Embodiments of the present invention will be described below in detail with reference to the drawings. In the description of the drawings the same elements will be denoted by the same reference signs, without redundant description.

(First Embodiment)

Figure 1:
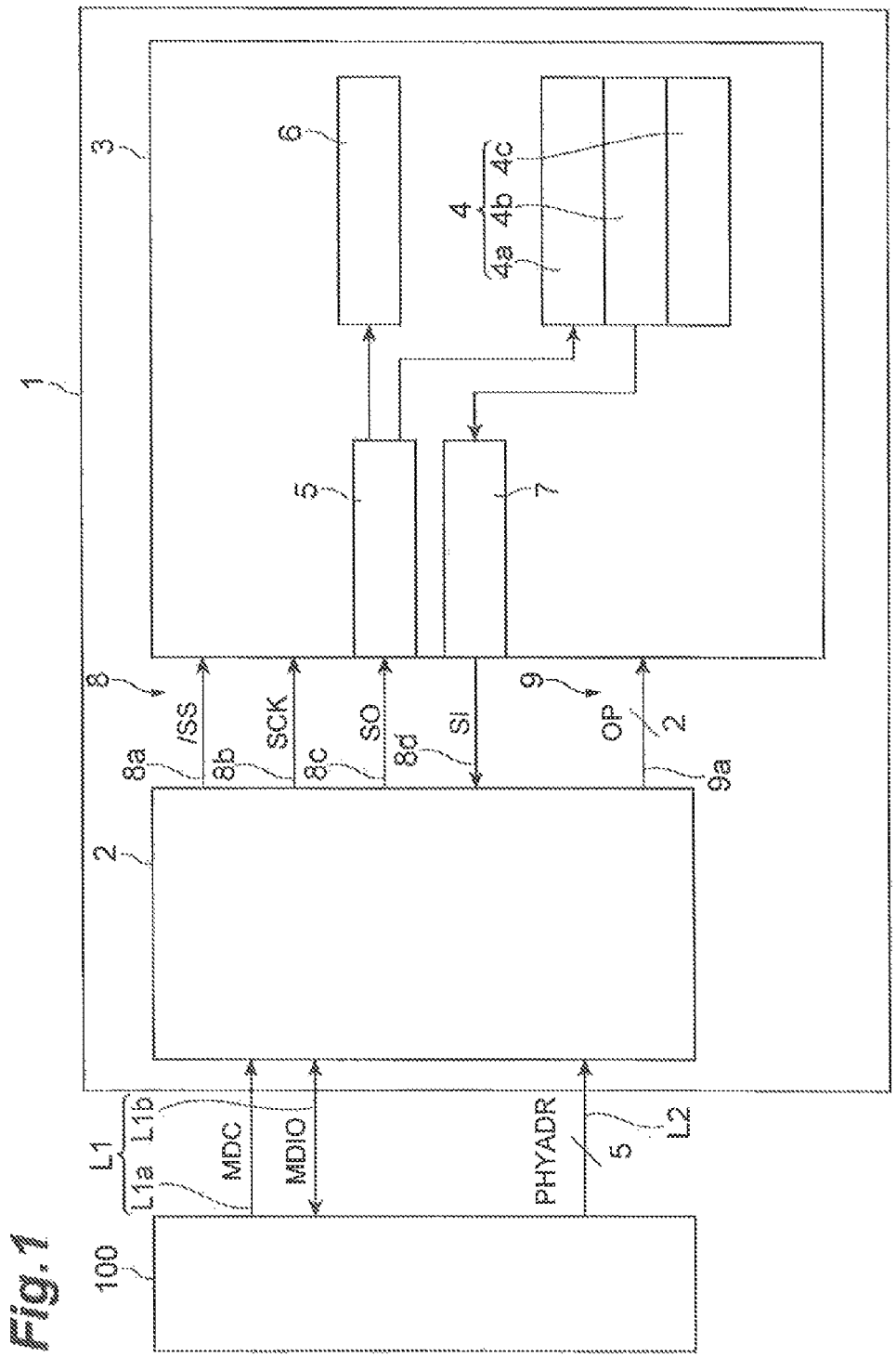
FIG. 1 is a block diagram showing a configuration of an optical transceiver according to the first embodiment.

FIG. 1 is a block diagram showing the configuration of the optical transceiver 1 according to the first embodiment. The optical transceiver 1 shown in FIG. 1 is an optical transceiver that can be inserted into and removed from an external upper layer 100. The specifications about the dimensions, terminal setup, electrical characteristics, and optical characteristics of the optical transceiver of this type are defined, for example, by CFP (100 G Form-factor Pluggable) of MSA (Multi-Source Agreement) Specifications. The upper layer 100 is also referred to as host device. The optical transceiver 1 has a logic device 2 and a microcomputer 3. The optical transceiver 1 transmits and receives electric signals through an MDIO bus L1 to and from the upper layer 100 and transmits and receives optical signals to and from another optical transceiver (not shown) connected through two optical fiber cables for transmission and for reception. The optical transceiver 1 performs bidirectional conversion between electric signals and optical signals and is equipped with components necessary for implementation thereof, e.g., a clock data recovery (CDR), a drive control circuit, a transmitter optical sub-assembly (TOSA), an optical multiplexer, a receiver optical sub-assembly (ROSA), and an optical demultiplexer. The microcomputer controls those components and monitors an operation condition, an operation state, etc. as monitoring of an internal state. Since the transmission and reception functions and the configuration of components for performing them are not directly related to the present invention, those components are not shown and are omitted from the description herein.

The logic device 2 is, for example, a programmable CPLD (Complex Programmable Logic Device) or FPGA (Field-Programmable Gate Array), or the like. The logic device 2 has an MDIO interface. When the optical transceiver 1 is incorporated into a device including the upper layer 100, it is connected to the upper layer 100 through the MDIO bus L1 and five (5-bit) signal lines L2 for addressing of physical layer. In that case, inside the optical transceiver 1 the logic device 2 is connected to the upper layer 100 through the MDIO bus L1 and the signal lines L2.

The MDIO bus L1 includes a signal line L1$a$ for clock signal MDC and a single line L1$b$ for data signal MDIO. Through the MDIO bus L1, communication is performed by an MDIO frame at a maximum frequency of the clock signal MDC, which is, e.g., 4 MHz (a minimum period of 0.25 μs).

Through the signal line L1b, normally, the MDIO frame is transmitted from the upper layer 100 to the logic device 2 but, in execution of "readout," a single data block read out from an MDIO register set 4 is transmitted from the logic device 2 to the upper layer 100. Therefore, communication is bidirectionally carried out at predetermined timing, depending upon command codes. The logic device 2 communicates with the upper layer 100 through the MDIO bus, and communicates with the microcomputer 3 through a serial communication bus 8 and a first dedicated signal line 9 in order to handle a command code given from the upper layer 100. Clock signal 8b (SCK) of the serial communication bus 8 uses a signal of the same frequency as the clock signal L1a (MDC) of the MDIO bus L1.

The microcomputer 3 is, for example, a one-chip microcomputer and is sometimes called Micro-Control Unit (MCU). The microcomputer 3 controls the CDR, drive control circuit, TOSA, and ROSA and can also control a voltage generating circuit, a thermoelectric device control circuit, a temperature detecting circuit, and others necessary for their operations. The microcomputer 3 is connected to those constituent elements through a serial communication bus or dedicated signal line or the like and can monitor the internal, state of the optical transceiver 1 by communication with them. The microcomputer 3 has the MDIO register set 4, a reception register 5 for temporarily storing a single data block received from the logic device 2, an address register 6 for storing address information, and a transmission register 7 for temporarily storing a single data block to be transmitted to the logic device 2.

The microcomputer 3 stores in the MDIO register set 4, a plurality of single data blocks indicative of the internal state of the optical transceiver 1, a single data block instructed to write by the upper layer, a single data block for identification of the optical transceiver (e.g., a manufacturers mane and a product serial number), and so on. The data indicative of the internal state of the optical transceiver 1 include, for example, the temperature of the optical transceiver 1, the voltage of a power supply in the optical transceiver 1, a bias current value of TOSA, an optical transmission power of TOSA, the temperature of a light emitting device of TOSA, a reception power of ROSA, or the like. The MDIO register set 4 has several hundred or more registers, but in FIG. 1 there are only three of them shown, storage area 4a, storage area 4b, and storage area 4c, for convenience' sake. Addresses are assigned for identifying the respective registers of the MDIO register set and an address is specified by address information. What kind of information should be stored in a register at each address is defined by the MSA Specification. A data block temporarily stored in the reception register 5, if it is a single data block indicative of the address information, is transferred to and stored in the address register 6; or, if it is a single data block to be stored in the MDIO register set 4, it is transferred to and stored in an MDIO register 4b specified by the address information stored in the address register 6 (the MDIO register 4b will be referred to hereinafter as "current register"). When "readout" is instructed by the command code, the single data block stored in the current register 4b is transferred to the transmission register 7 and further transmitted through the serial communication bus 8 to the logic, device 2. Every time the microcomputer 3 receives the address information or a single data block from the logic device 2, it writes the single data block stored in the storage area 4b specified by the information stored in the address register 6 (address information), into the transmission register 7.

The logic device 2 and the microcomputer 3 are connected through the serial communication bus 8 and the first dedicated signal line 9 independent of the serial communication bus 8. The serial communication bus 8 has a signal line 8a for /SS (slave selector) signal, a signal line 8b for SCK (transfer clock) signal, a signal line 8c for SO (data output) signal, and a signal line 8d for SI (data input) signal. Serial communication is carried out between a master device to control communication and a slave device to operate in accordance with a command from the master device. In the embodiments of the present invention, the logic device 2 serves as a master device while the microcomputer 3 does as a slave device. As a modification example, another slave device can be connected to the serial communication bus 8. In that case, however, the other slave device and the master device need to be connected in 1:1 relationship by preparing another line for slave selector signal. Data input and data output are defined as follows: with respect to the logic device 2 as master device, signals in the direction of output from the logic device 2 are called data output and signals in the direction of input into the logic device 2 data output. The logic device 2 transmits the address information and a single data block through the serial communication bus L1 to the microcomputer 3. The first dedicated signal line 9 has two signal lines for command code (OP code). The logic device 2 transmits information of the command code as parallel data through the first dedicated signal line 9 to the microcomputer 3.

Figure 2:
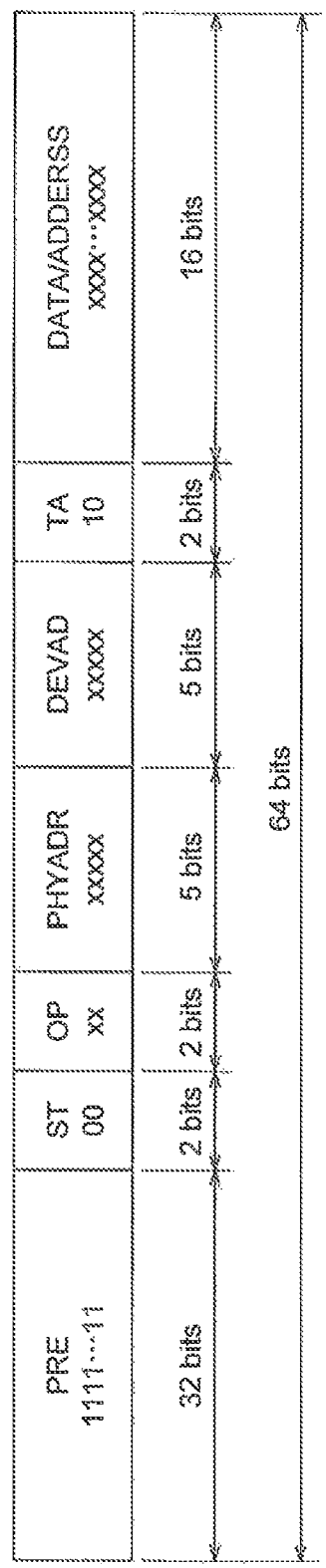
FIG. 2 is a drawing showing structure of the MDIO frame

As described above, the logic device 2 reads and writes the single data block in the MDIO register set 4 specified by the address information designated by the upper layer 100, in accordance with the command code through the serial communication bus 8. On the other hand, transmission and reception of single data block is carried out according to an MDIO frame between the logic device 2 and the upper layer 100. The MDIO frame transmitted and received between the optical transceiver 1 and the upper layer 100 has, for example, the frame structure defined by IEEE 802.3 Clause 45, CFP MSA Management Interface Specification. The following describes the frame structure of the MDIO frame with reference to FIG. 2.

The MDIO frame is composed of 32-bit preamble part (Preamble), start bits (ST, 2 bits), OP (Operation) code (OP, 2 bits), physical port address (PHYADR, 5 bits), MDIO device address (DEVAD, 5 bits), turnaround bits (TA, 2 bits), and 16-bit address/data part.

The upper layer 100 sends the MDIO frame through the MDIO bus L1 to the optical transceiver 1. In the embodiments of the present invention, the MDIO bus L1 is connected to the logic device 2 inside the optical transceiver 1. Therefore, the logic device 2 receives the MDIO frame sent from the upper layer 100. The signal line L2 is also connected from the upper layer 100 to the logic device 2 as the MDIO bus L1 is. The signal line L2 consists of five signal lines and transmits the address information corresponding to the physical port address PHYADR of the MDIO frame to the optical transceiver 1. For example, let us suppose that address data 0b00001 (first appearing symbol 0b means that the number subsequent to 0b is binary data) is preliminarily fed to the optical transceiver 1 through the signal line L2, prior to a start of communication with the upper layer 100 through the MDIO bus L1; the optical transceiver 1 stores the address data and, when the physical port address data, PHYADR of the MDIO frame coincides with 0b00001, the logic device 2 recognizes that the MDIO frame sent from the upper layer 100 is one directed to itself, receives the MDIO frame, and performs a process according to the command code of the received MDIO frame. If the physical port address data PHYADR of the MDIO frame is not 0b00001, the logic device 2 recognizes that the MDIO frame is directed to another optical transceiver (not shown) connected to the MDIO bus, and ignores it. MDIO device address DEVAD is address information about the optical transceiver specified by the physical port address, for further specifying a device inside the optical transceiver and, for example, the values defined by the CFP MSA Specification are used for the address information.

The OP code (OP) is 2-bit data and is used for giving a command of one of four types, address setting (Address), writing (Write), readout (Read), and increment-added readout (Post Read inc Add). Specifically, the OP code is defined as follows by the MSA Specification: 0b00 for address setting; 0b01 for writing; 0b11 for readout; 0b10 for increment-added readout. The turnaround bits (TA) indicate a 2-bit timing gap (time interval) necessary for a turnaround of signal direction on the MDIO bus (a turnaround of the logic device 2 from reception of the MDIO frame to transmission of the read single data block to the upper layer 100) in the case of readout or increment-added readout. The timing gap is defined in terms of one bit. A time of one bit is one cycle of the clock signal line L1a (MDC).

Figure 3:
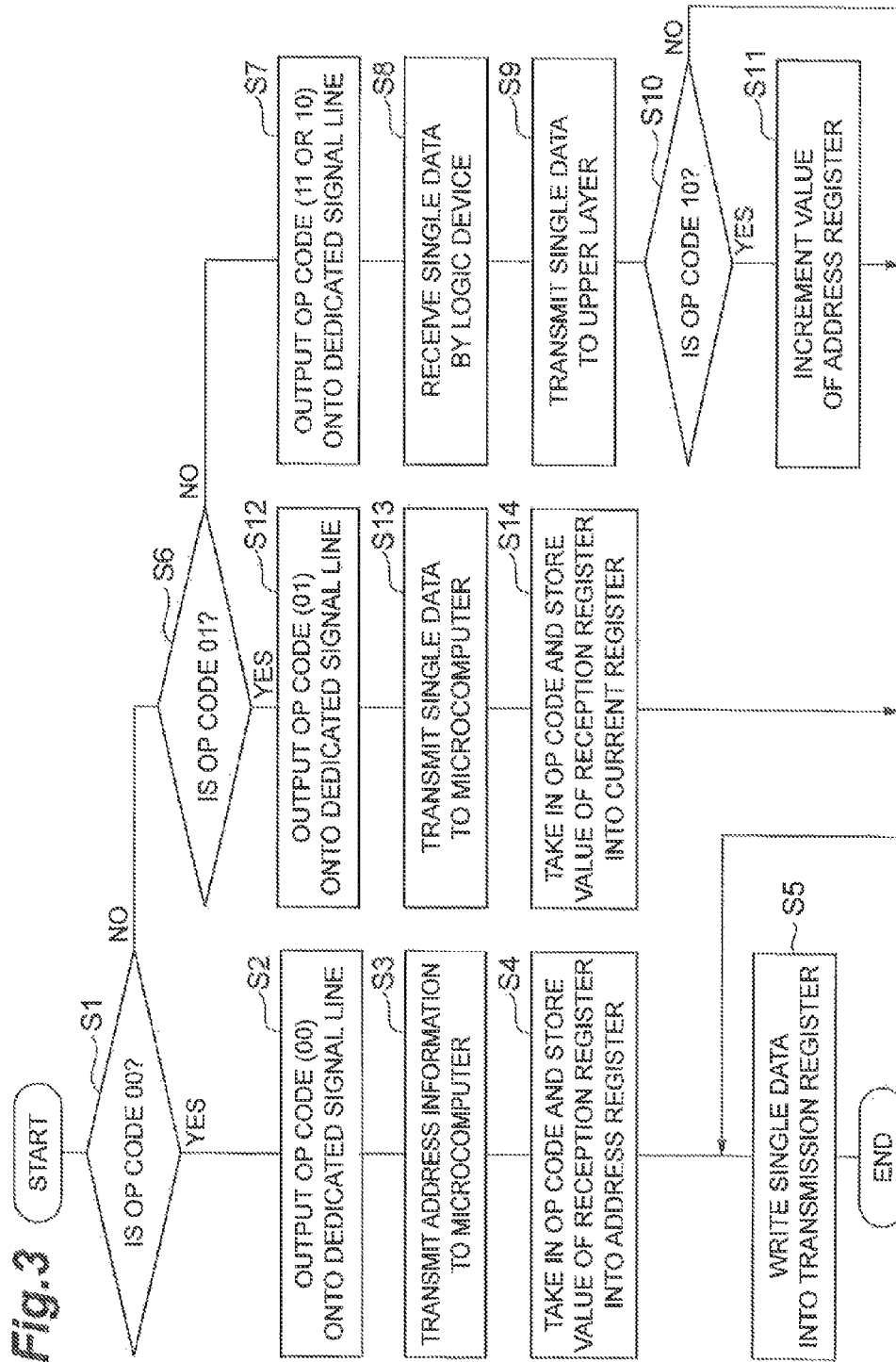
FIG. 3 is a flowchart showing a process of the optical transceiver.
Figure 4:
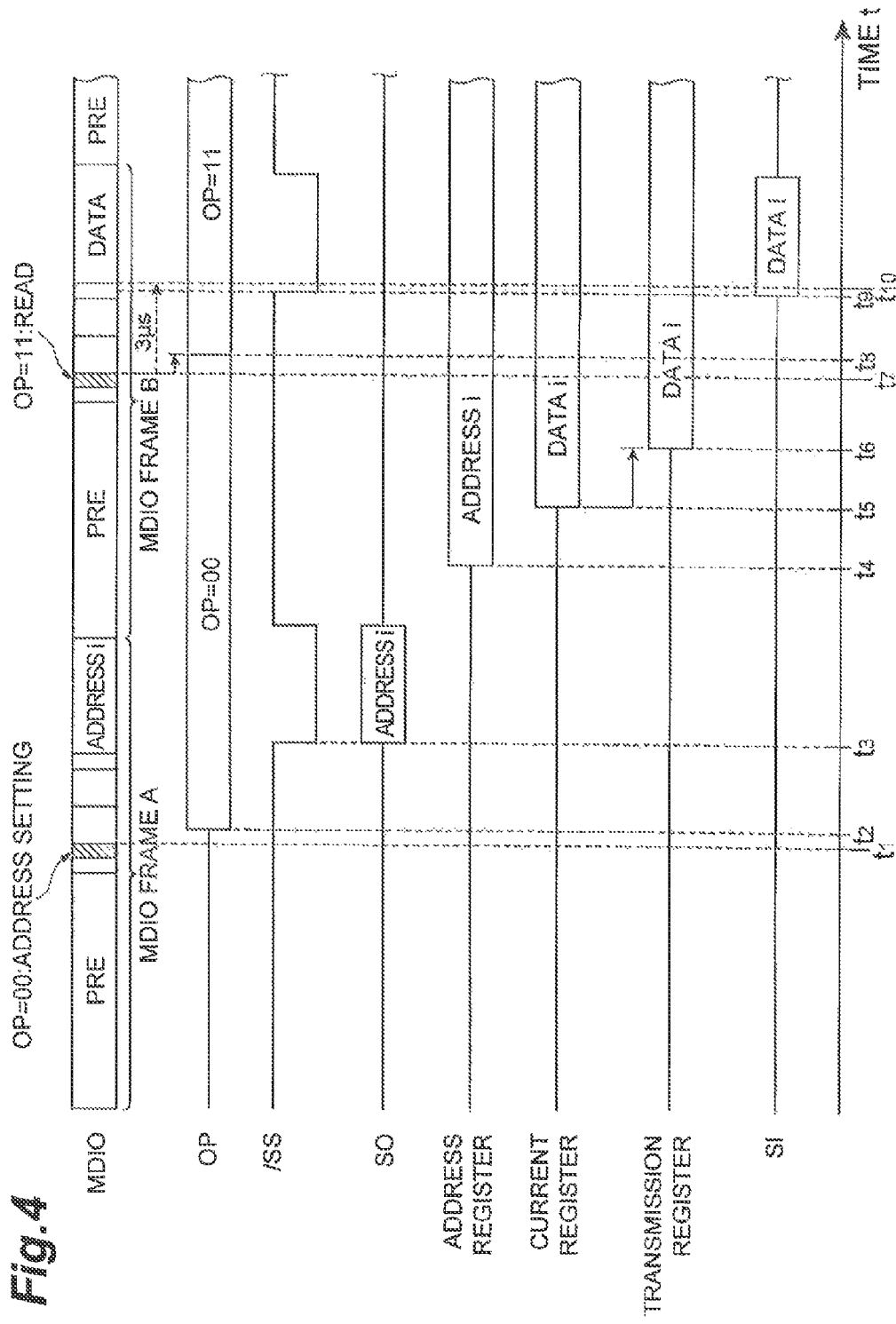
FIG. 4 is a timing chart showing a process of the optical transceiver when the OP code is "read".
Figure 5:
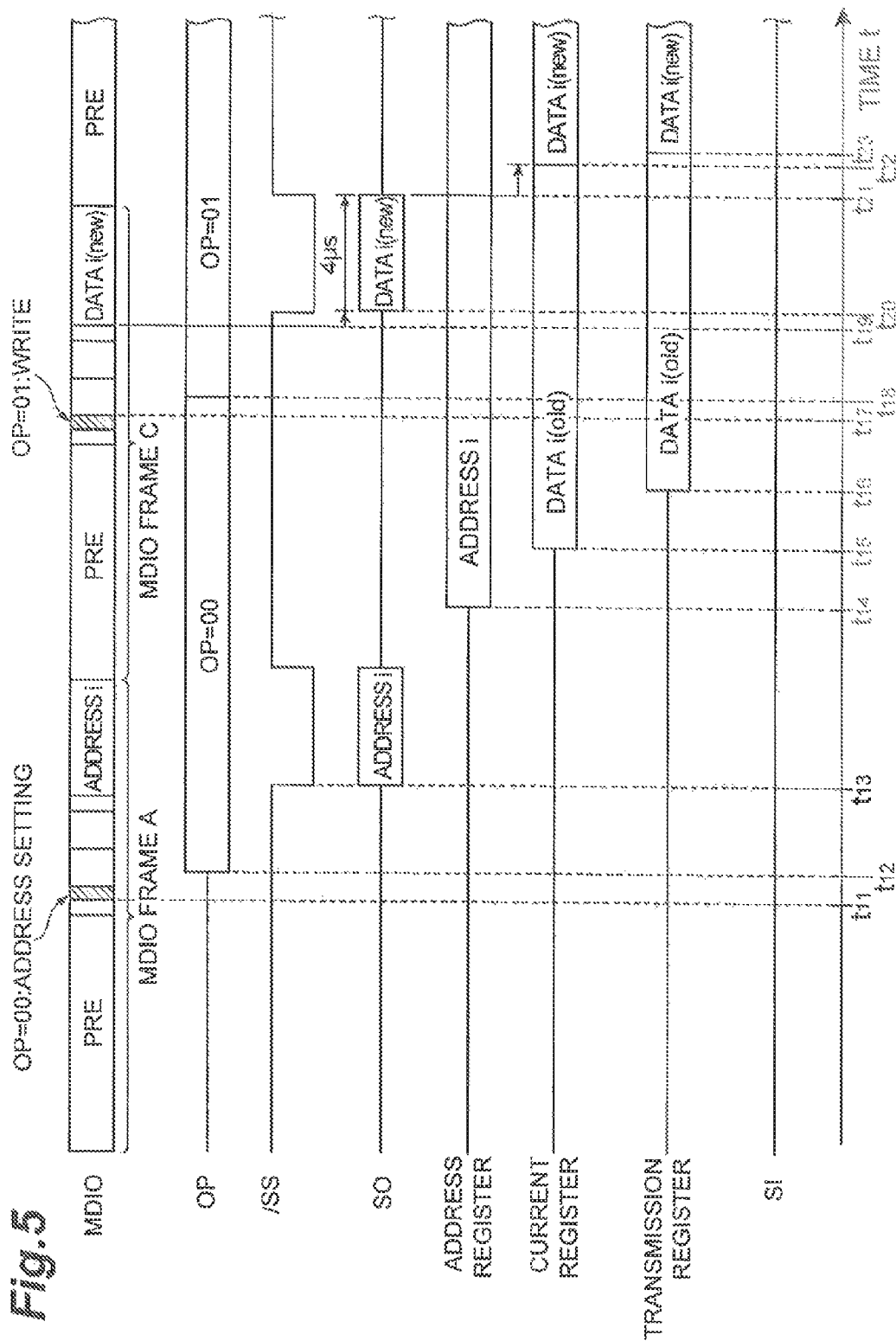
FIG. 5 is a timing chart showing a process of the optical transceiver when the OP code is "write".

FIGS. 3 to 5 are drawings for illustrating the operation of the optical transceiver 1. The following describes with reference to FIG. 3 and FIG. 4, a process in a situation in which the upper layer 100 instructs the optical transceiver 1 to perform readout in succession to the address setting by MDIO frames. FIG. 3 shows a flow of the process executed by the logic device 2 and the microcomputer 3 with the MDIO frames received from the upper layer 100. The process shown in FIG. 3 is executed by the logic device 2 and the microcomputer 3, every time MDIO frame is received from the upper layer 100. FIG. 4 is a timing chart showing changes against time of signals on the serial communication bus 8, signals on the first dedicated signal line 9, and single data of the registers in the microcomputer 3 when the logic device 2 receives the MDIO frames from the upper layer 100. Here, the address setting refers to a process of storing the address information in an MDIO frame into the address register 6 and newly determining (or selecting) the current register 4b. Readout refers to a process carried out by the logic device 2 to read out data in the current register 4b through the serial, communication bus 8 and transmit the data to the upper layer 100 at predetermined timing determined by an MDIO frame.

In step S1 ("S1" hereinafter, the same applies to the other steps), the logic device 2 determines whether the OP code is 0b00. While the logic device 2 receives MDIO frame A with the OP code 0b00 shown in FIG. 4 from the upper layer 100, it receives the OP code (YES in S1, at time t1 in FIG. 4) and then the logic device 2 outputs the OP code 0b00 onto the first dedicated signal line 9 (S2, at time t2 in FIG. 4). The OP code is 2 bits and is sent as parallel data, for example, by assigning one of the two signal lines of the first dedicated signal line 9 to the first bit of the OP code and the other to the second bit of the OP code.

The logic device 2 switches the /SS signal from High to Low, thereby to transmit the address information contained in the MDIO frame to the reception register 5 of the microcomputer 3 (S3, at time t3 in FIG. 4). After completion of reception of the address information into the reception register 5, the microcomputer 3 stores the address information in the reception register 5 into the address register 6 in accordance with the OP code received through the first dedicated signal line 9 (S4, at time t4 in FIG. 4). As the address information in the reception register 5 has been stored in the address register 6, the current register 4b in the MDIO register set 4 specified thereby is newly determined. Then, the microcomputer 3 stores the single data block stored in the current register 4b, into the transmission register 7 (S5, at times t5, t6 in FIG. 4).

During the foregoing operation the logic device 2 starts receiving MDIO frame B with the OP code 0b11 shown in FIG. 4, from the upper layer 100 and, when receiving the OP code (NO in S1 and in S6, at time t7 in FIG. 4), the logic device 2 outputs the OP code 0b11 onto the dedicated signal line 9 (S7, at time t8 in FIG. 4). The logic device 2 changes the /SS signal of the serial communication bus 8 from High to Low to start reading the single data block in the transmission register 7 from the microcomputer 3 through the data input SI (S8). After a 1-bit delay from the timing of switching to 0b0 in TA of the MDIO frame B (time t9 in FIG. 4), the logic device 2 starts transmitting the single data block through the MDIO bus L1 to the upper layer 100 (at time t10 in FIG. 4). The time interval (t10-t7) corresponds to 12 bits in terms of a bit count of the MDIO frame. The maximum frequency defined by CFP MSA is 4 MHz, and in that case the period of one bit is 0.25 μs. Therefore, a minimum value of the time interval (t10-t7) is 3 μs (0.25 μs/bit×12 bits). According to the present invention, the single data block in the current register 4b in the microcomputer 3 can be read out and sent through the MDIO bus to the upper host within the minimum time duration.

After the logic device 2 has transmitted the single data block to the upper layer 100, the logic device 2 determines whether the OP code is 0b10 (S10). When the OP code is 0b10 (YES in S10), the microcomputer 3 increments the value in the address register 6 (S11). After completion of the process of S11, or when it is determined in S10 that the OP code is not 0b10 (NO in S10), the operation shifts to S5 to let the microcomputer 3 write the single data block into the transmission register 7.

The following describes a process in a situation in which the upper layer 100 instructs the optical transceiver 1 to perform writing in succession to the address setting by MDIO frames, with reference to FIG. 3 and FIG. 5. FIG. 5 is a timing chart showing changes against time of signals on the serial communication bus 8, signals on the first dedicated signal line 9, and data in the registers in the microcomputer 3 when the logic device 2 receives the MDIO frames from the upper layer 100. The term "writing" herein refers to a process of storing the single data block in the MDIO frame transmitted through the MDIO bus L1 from the upper layer 100, into the current register 4b in the microcomputer 3.

When receiving the OP code during reception of MDIO frame A shown in FIG. 5 from the upper layer 100 (YES in S1, at time t11 in FIG. 5), the logic device 2 outputs the OP code 0b00 onto the first dedicated signal line 9 (S2, at time t12 in FIG. 5). Thereafter, the logic device 2 switches the /SS signal from High to Low, thereby to transmit the address information to the reception register 5 of the microcomputer 3 (S3, at time t13 in FIG. 5). After completion of reception of the address information into the reception register 5, the microcomputer 3 stores the address information in the reception register 5 into the address register 6 in accordance with the OP code received through the first dedicated signal line 9 (S4, at time t14 in FIG. 5). As the address information in the reception register 5 has been stored in the address register 6, the current register 4b in the MDIO register set 4 specified thereby is newly determined. Then, the microcomputer 3 stores the single data block stored in the current register 4b, into the transmission register 7 (S5, at times t15, t16 in FIG. 5).

During the foregoing operation the logic device 2 starts receiving MDIO frame C with the OP code 0b01 shown in FIG. 5, from the upper layer 100 and, when receiving the OP code (NO in S1 and YES in S6, at time t17 in FIG. 5), the logic device 2 outputs the OP code 0b01 onto the dedicated signal line 9 (S12, at time t18 in FIG. 5). The logic device 2 changes the /SS signal of the serial communication bus 8 from High to Low to transmit the single data block received from the upper layer 100 to the reception register 5 of the microcomputer 3 through the data output SO (S13). In the case of writing, irrespective of the timing of switching to "0" in TA of the MDIO frame C, the logic device 2 switches the /SS signal from High to Low after a start of receiving the first bit of the single data block, to transmit the single data block through the data output SO to the reception register 5 (S13, at time t20 in FIG. 5). Namely, the writing process is free of the restriction that the process should be performed within 12 bits from the OP code to TA, and the operations of the logic device 2 and the microcomputer 3 are allowed to have some extra time in comparison with the reading process.

After completion of the writing of the single data block into the reception register 5 (at time t21 in FIG. 5), the microcomputer 3 stores the single data block into the current register 4b in accordance with the OP code received through the first dedicated signal line 9 (S14, at time t22 in FIG. 5). Then, the microcomputer 3 writes the single data block into the transmission register 7 (S5, at time t23 in FIG. 5). Since the single data block stored in the current register has been transferred to the transmission register at this point, when the microcomputer 3 is next instructed to read by the upper layer 100, the reading process from the microcomputer 3 can be implemented by simply transmitting the single data block from the transmission register 7 to the logic device 2 through the serial communication bus 8.

In the optical transceiver 1, as described above, the logic device 2 transmits the address information and single data block through the serial communication bus 8 and transmits the OP code through the first dedicated signal line 9. The microcomputer 3 writes the single data block stored in the MDIO register specified by the address information stored in the address register 6, into the transmission register 7 every time the microcomputer 3 performs the process for the OP code. Therefore, it becomes feasible to shorten the time duration needed by the logic device 2 from the reception of the OP code read through the MDIO bus from the upper layer 100, to the start of transmission of the single data block read from the MDIO register in the microcomputer 3, through the MDIO bus to the upper layer 100.

Figure 8:
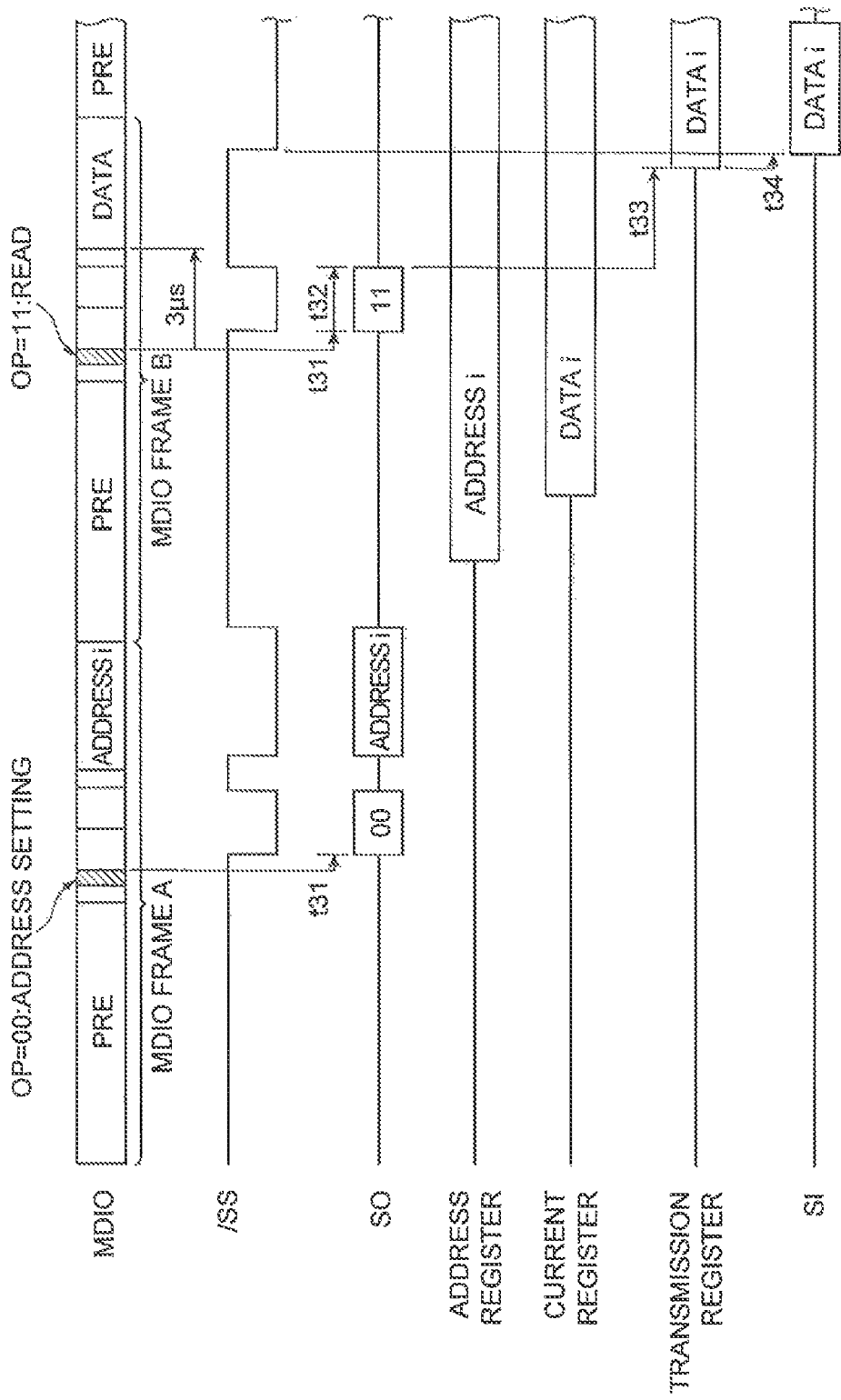
FIG. 8 is a timing chart showing a process of a conventional optical transceiver when the OP code is "read".

As shown in FIG. 8, a time available for the logic device 2 from the reception of the OP code of readout from the upper layer 100 to the start of transmission of the single data block is only the length of 12 bits (e.g., the minimum time is 3 μs in the case of the maximum frequency 4 MHz). However, the conventional optical transceiver requires a time longer than 3 μs, as a result of totaling a time t31 for the logic device 2 to receive the OP code of 2-bit length, convert it into proper serial data (of 8-bit length in general), and start transmitting the data to the microcomputer 3, a transfer time t32 of the OP code by serial communication from the logic device 2 to the microcomputer 3, a total t33 of an overhead time of an external interrupt process by microcomputer's software for the slave selector signal (/SS) and a time for transferring the single data block stored in the current register 4b to the transmission register 7, a time t34 for the logic device 2 to start receiving the single data block of the transmission register 7 by serial communication, and a time t35 (not shown) for the logic device 2 to start transmitting the single data block received by serial communication to the upper layer through the MDIO bus L1. Therefore, in the case of the conventional optical transceiver, it is difficult to adopt the serial communication bus as a communication bus for connection between the logic device and the microcomputer.

However, the optical transceiver 1 is configured to transmit the OP code through the path different from that for the address information and the single data block to the microcomputer 3. Therefore, it can eliminate the transfer time t32 of the OP code from the logic device 2 to the microcomputer 3. Then, the time duration from the reception of the OP code from the upper layer 100 (at time t7 in FIG. 4) by the logic device 2 to the start of transmission of data value by the microcomputer 3 (at time t10 in FIG. 4) can be made shorter than 3 μs. Therefore, this configuration allows the serial communication bus to be used as a communication bus for connection between the logic device 2 and the microcomputer 3 and thus allows a relatively small-size microcomputer to be adopted as the microcomputer 3, thereby achieving downsizing of the optical transceiver 1.

Every time the microcomputer 3 receives the address information or single data block from the logic device 2, the microcomputer 3 writes the single data block stored in the MDIO register 4 (specifically, the current register 4b), into the transmission register 7. In this manner, the data transfer from the MDIO register 4 to the transmission register 7 is carried out in advance. Concerning the aforementioned time t33 in the conventional optical transceiver, the transfer of the single data block from the current register 4b to the transmission register 7 is performed earlier, i.e., immediately after the storage of the address information into the address register 6 (times t5, t6 in FIG. 4) and the time duration is shortened by the time necessary for the transfer. Therefore, reduction is achieved in the time of readout of the single data block stored in the MDIO register 4 by the upper layer 100.

(Second Embodiment)

Figure 6:
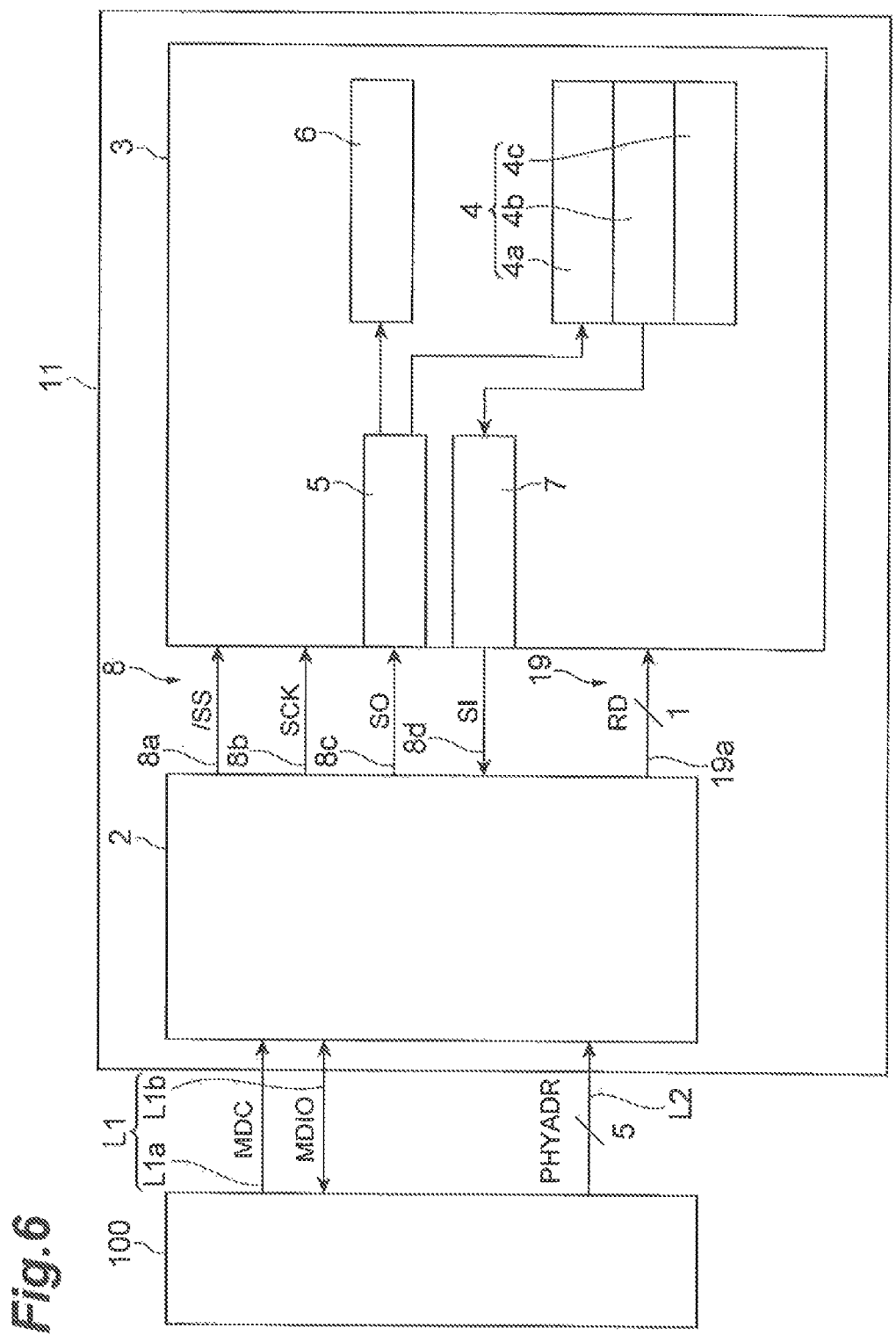
FIG. 6 is a drawing showing a configuration of an optical transceiver according to the second embodiment.

FIG. 6 shows the optical transceiver 11 of the second embodiment. The optical transceiver 11 of the second embodiment is different from the optical transceiver 1 of the first embodiment, only in that the first dedicated signal line 9 in the first embodiment is replaced by a second dedicated signal line 19 for transmitting a 1-bit signal to the microcomputer 3. The second dedicated signal line 19 has only one (1-bit) signal line. The logic device 2 transmits 1-bit information (RD) through the second dedicated signal line 19 to the microcomputer 3. This 1-bit information (RD) is information about whether the OP code sent from the upper layer 100 is a readout command. Namely, the logic device 2 transmits the information about whether the OP code is 0b11 or 0b10 through the second dedicated signal line 19 to the microcomputer 3.

In the optical transceiver 11 of the second embodiment, the information about whether the OP code is readout is one bit whereas the OP code itself is two bits. Therefore, the number of lines can be reduced from that of the first dedicated signal line, by transmitting the information about whether the OP code is readout through the second dedicated signal line 19 to the microcomputer 3. As a consequence, the optical transceiver 11 can be more downsized.

(Third Embodiment)

Figure 7:
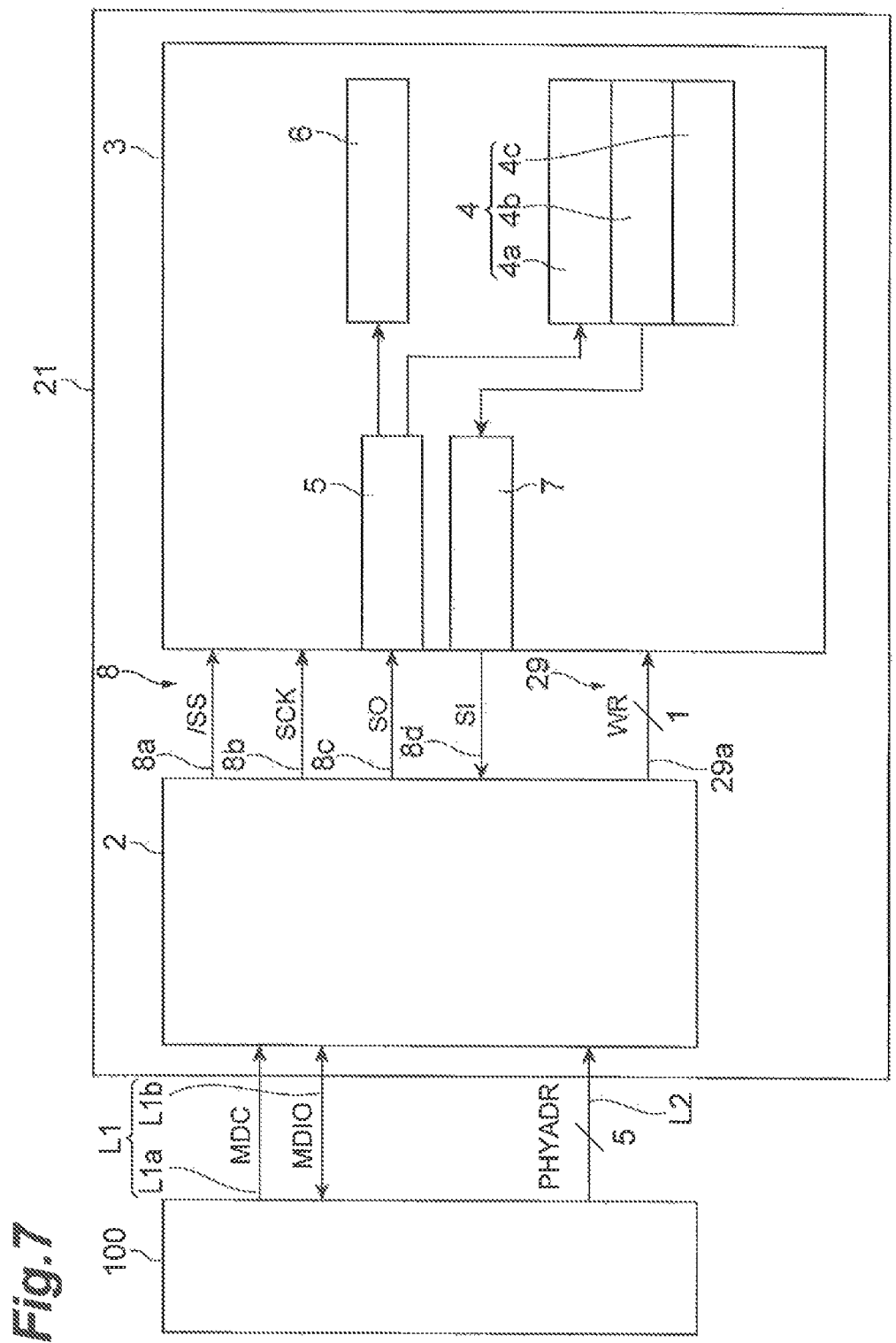
FIG. 7 is a drawing showing a configuration of an optical transceiver according to the third embodiment.

FIG. 7 Shows the optical transceiver 21 of the third embodiment.

The optical transceiver 21 of the third embodiment is different from the optical transceiver 1 of the first embodiment, only in that the first dedicated signal line 9 in the first embodiment is replaced by a third dedicated signal line 29 for transmitting a 1-bit signal to the microcomputer 3. The third dedicated signal line 29 has only one (1 bit) signal line. The logic device 2 transmits 1-bit information (WR) through the third dedicated signal line 29 to the microcomputer 3. This 1-bit information (WR) is information about whether the OP code sent from the upper layer 100 is writing. Namely, the logic device 2 transmits the information about whether the OP code is 0b01 through the third dedicated signal line 29 to the microcomputer 3.

In the optical transceiver 21 of the third embodiment, the information about whether the OP code is writing is one bit whereas the OP code itself is two bits. Therefore, the number of lines can be reduced from that of the first dedicated signal line, by transmitting the information about whether the OP code is writing through the third dedicated signal line 29 to the microcomputer 3. As a consequence, the optical transceiver 21 can be more downsized.

The above illustrated and described the principles of the present invention in the preferred embodiments and it is to be recognized by those skilled in the art that the present invention can be modified in arrangement and details without departing from the principles. The present invention is not limited to the specific configurations disclosed in the embodiments. Therefore, the Inventor claims the rights to all modifications and changes resulting from the scope of claims and the scope of spirit thereof.

What is claimed is:

1. An optical transceiver to communicate with an external upper layer through a management data input/output (MDIO) bus, the optical transceiver comprising:
   a microprocessor configured to monitor and control an internal state of the optical transceiver, the microprocessor including a transmission register, a reception register, an address register, and a plurality of MDIO registers, the address register specifying one of the MDIO registers as a current register, the transmission register being configured to store a single data block transferred from the current register every time the address register or the current register is updated;
   a logic device configured to receive first serial data and second serial data from the upper layer through the MDIO bus and convert the first serial data to first parallel data, the second serial data coming after the first serial data;
   a serial peripheral interface (SPI) bus configured to send the second serial data from the logic device to the reception register and to send the single data block from the transmission register to the logic device; and
   two digital signal lines configured to send the first parallel data from the logic device to the microprocessor in parallel with the SPI bus,
   wherein the second serial data is sent from the logic device to the microprocessor through the SPI bus after the first parallel data is sent from the logic device to the microprocessor through the two digital signal lines, and
   wherein the single data block is stored in the transmission register before the microprocessor receives next first serial data that follows the first serial data.

2. The optical transceiver according to claim 1,
   wherein the first serial data consists of a first bit and a second bit in series,
   wherein the first bit is sent through one of the two digital signal lines, and at the same time the second bit is sent through another of the two digital signal lines.

3. The optical transceiver according to claim 2,
   wherein the microprocessor updates the address register by transferring the second serial data received in the reception register to the address register when the first bit is "0" and the second bit is "0",
   wherein the microprocessor updates the current register by transferring the second serial data received in the reception register to the current register when the first bit is "0" and the second bit is "1", and
   wherein the microprocessor updates the address register by incrementing the address therein by one when the first bit is "1" and the second bit is "0".

4. The optical transceiver according to claim 2,
   wherein the microprocessor receives the first parallel data from the logic device through the two digital signal lines with a first delay time,
   wherein the logic device receives a first bit of the single data block stored in the transmission register from the microprocessor through the SN bus with a second delay time,
   wherein the logic device outputs the first bit of the single data block with a third delay time after the logic device receives the first hit of the single data block, and
   wherein the optical transceiver reduces a sum of the first delay time, the second delay time, and the third delay time to less than three micro seconds.

* * * * *